(12) United States Patent
Howorka et al.

(10) Patent No.: US 7,184,982 B1
(45) Date of Patent: Feb. 27, 2007

(54) ARCHITECTURE FOR ANONYMOUS TRADING SYSTEM

(75) Inventors: Edward R. Howorka, Morris Plains, NJ (US); Andrew P. Foray, Wayne, NJ (US)

(73) Assignee: EBS Group Limited, London (GB)

(*) Notice: Subject to any disclaimer, the term of this patent is extended or adjusted under 35 U.S.C. 154(b) by 1105 days.

(21) Appl. No.: 09/603,523

(22) Filed: Jun. 23, 2000

(51) Int. Cl.
*G06Q 40/00* (2006.01)

(52) U.S. Cl. .................... 705/37; 705/36 R; 705/38

(58) Field of Classification Search .............. 705/1, 705/26–27, 37, 36 R, 38
See application file for complete search history.

(56) References Cited

U.S. PATENT DOCUMENTS

| | | |
|---|---|---|
| 3,823,387 A | 7/1974 | McClellan |
| 4,388,489 A | 6/1983 | Wigan et al. |
| 4,525,779 A | 6/1985 | Davids et al. |
| 4,531,184 A | 7/1985 | Wigan et al. |
| 4,554,418 A | 11/1985 | Toy |
| 4,555,781 A | 11/1985 | Baldry et al. |
| 4,598,367 A | 7/1986 | DeFrancesco et al. |
| 4,623,964 A | 11/1986 | Getz et al. |
| 4,750,135 A | 6/1988 | Boilen |
| 4,815,030 A | 3/1989 | Cross et al. |
| 5,003,473 A | 3/1991 | Richards |
| 5,034,916 A | 7/1991 | Ordish |
| 5,077,665 A | 12/1991 | Silverman et al. |
| 5,136,501 A | 8/1992 | Silverman et al. |
| 5,195,031 A | 3/1993 | Ordish |
| 5,230,048 A | 7/1993 | Moy |
| 5,257,369 A | 10/1993 | Skeen et al. |
| 5,258,908 A * | 11/1993 | Hartheimer et al. .......... 705/37 |
| 5,267,148 A | 11/1993 | Kosaka et al. |
| 5,270,922 A | 12/1993 | Higgins |
| 5,287,787 A | 2/1994 | Inoue |
| 5,508,913 A | 4/1996 | Yamamoto et al. |
| 5,557,780 A | 9/1996 | Edwards et al. |
| 5,557,798 A | 9/1996 | Skeen et al. |
| 5,615,269 A | 3/1997 | Micali |
| 5,710,889 A | 1/1998 | Clark et al. |
| 5,727,165 A | 3/1998 | Ordish et al. |

(Continued)

FOREIGN PATENT DOCUMENTS

EP 0434224 6/1991

(Continued)

OTHER PUBLICATIONS

Mini Computer forum, Conference Proceedings, 1975.

(Continued)

*Primary Examiner*—Hani M. Kazimi
*Assistant Examiner*—Stefano Karmis
(74) *Attorney, Agent, or Firm*—Dickstein Shapiro LLP

(57) ABSTRACT

An anonymous trading system suitable for trading foreign exchange or other fungible instruments comprises a network of broking nodes each of which have equal status and each of which perform the function of matching orders input into the systems, executing trades and distributing market views. Trading agent nodes are connected to some or all of the broking nodes and act as an interface between trader terminals or other order input devices through which orders are submitted to the system, and the broking nodes. Orders may be input into the system as visible quotes or invisible hits.

22 Claims, 6 Drawing Sheets

U.S. PATENT DOCUMENTS

| | | | |
|---|---|---|---|
| 5,787,402 A | 7/1998 | Potter et al. | |
| 5,809,483 A | 9/1998 | Broka et al. | |
| 5,815,665 A | 9/1998 | Teper et al. | |
| 5,864,827 A | 1/1999 | Wilson | |
| 5,870,544 A | 2/1999 | Curtis | |
| 5,890,140 A | 3/1999 | Clark et al. | |
| 5,905,248 A | 5/1999 | Russell et al. | |
| 5,905,974 A | 5/1999 | Fraser et al. | |
| 5,909,545 A | 6/1999 | Frese, II et al. | |
| 5,915,209 A | 6/1999 | Lawrence | |
| 5,924,082 A | 7/1999 | Silverman et al. | |
| 5,924,083 A | 7/1999 | Silverman et al. | |
| 5,966,531 A | 10/1999 | Skeen et al. | |
| 6,014,627 A * | 1/2000 | Togher et al. | 705/1 |
| 6,260,025 B1 * | 7/2001 | Silverman et al. | 705/37 |

FOREIGN PATENT DOCUMENTS

| | | |
|---|---|---|
| EP | 0485252 | 5/1992 |
| EP | 0512702 | 11/1992 |
| EP | 0 399 850 | 12/1995 |
| EP | 0798635 | 10/1997 |
| EP | 0818746 | 1/1998 |
| EP | 0893758 | 1/1999 |
| EP | 0907134 | 4/1999 |
| FR | 2543327 | 9/1984 |
| GB | 1489574 | 10/1977 |
| GB | 2165421 | 4/1986 |
| GB | 2180380 | 3/1987 |
| GB | 2210714 | 6/1989 |
| GB | 2282246 | 3/1995 |
| GB | 2325130 | 11/1998 |
| GB | 2326256 | 12/1998 |
| WO | 90/02382 | 3/1990 |
| WO | 92/07324 | 4/1992 |
| WO | 92/15174 | 9/1992 |
| WO | 93/15467 | 8/1993 |
| WO | 94/15294 | 7/1994 |
| WO | 95/06918 | 3/1995 |
| WO | 95/18418 | 7/1995 |
| WO | 95/30211 | 11/1995 |
| WO | 96/18963 | 6/1996 |
| WO | 96/34357 | 10/1996 |
| WO | 97/22072 | 6/1997 |
| WO | 97/24833 | 7/1997 |
| WO | 97/31322 | 8/1997 |
| WO | 97/33215 | 9/1997 |
| WO | 97/36253 | 10/1997 |
| WO | 97/43727 | 11/1997 |
| WO | 97/45802 | 12/1997 |
| WO | 97/49050 | 12/1997 |
| WO | WO 97/45802 | 12/1997 |
| WO | 98/05011 | 2/1998 |
| WO | 98/13796 | 4/1998 |
| WO | 98/21667 | 5/1998 |
| WO | 98/24041 | 6/1998 |
| WO | 98/26344 | 6/1998 |
| WO | 98/26363 | 6/1998 |
| WO | 98/36456 | 8/1998 |
| WO | 98/38558 | 9/1998 |
| WO | 98/47268 | 10/1998 |
| WO | 98/49635 | 11/1998 |
| WO | 98/49639 | 11/1998 |
| WO | 98/53581 | 11/1998 |
| WO | 99/01983 | 1/1999 |
| WO | 99/08419 | 2/1999 |
| WO | 99/10795 | 3/1999 |
| WO | 99/10815 | 3/1999 |
| WO | 99/14695 | 3/1999 |
| WO | 99/19821 | 4/1999 |
| WO | 99/27477 | 6/1999 |
| WO | 99/33242 | 7/1999 |
| WO | 99/35583 | 7/1999 |
| WO | 99/36875 | 7/1999 |
| WO | 99/40502 | 8/1999 |
| WO | 99/41690 | 8/1999 |
| WO | 99/50771 | 10/1999 |

OTHER PUBLICATIONS

Wall Street Computer Review, 1998.
Computers in the City, Conference Proceedings, 1988.
Banking Technology, 1988, vol. 5, No. 5.

* cited by examiner

ARCHITECTURE FOR ANONYMOUS TRADING SYSTEM

TECHNICAL FIELD

The present invention relates to a computer trading system for providing an electronic broking service for tradable items such as foreign exchange and financial instruments generally. In particular, the invention relates to a computer trading system having a plurality of trader terminals connected to a network for submission and matching of bids, offers, buy and sell orders.

BACKGROUND TO THE INVENTION

An anonymous trading system is known, for example, in EP-A-0,399,850, EP-A-0,406,026 and EP-A-0,411,748 which disclose an automated matching system for anonymous trading of foreign currencies (or other financial instruments). In this system, a single host computer maintains a central database of all trading instruments available for trade, credit information and bids and offers which have been submitted by terminals connected to the host via a computer network. The host computer uses information in its central database to match bids and offers and buy and sell orders based on matching criteria which include a counter party credit limit.

The counter party credit limits are set at each trading floor, and are stored at the host computer, which then establishes a gross counter party credit limit for each possible pair of counter-parties. The gross counter party credit limit is the minimum amount of the remaining credit from a first party to a second party, and the second party to the first party. The various trader terminals connected to the host computer maintain and display only a restricted subset of the information available at the host computer, such as best bids and offers.

A problem was identified with this system in that the host computer only used the credit information to check that a deal could proceed after a potential match had been identified. A trader thus could not know whether he had credit with a potential counter party prior to attempting to trade. This problem was identified and a solution provided in the system disclosed in U.S. Pat. No. 5,375,055.

In the system disclosed in U.S. Pat. No. 5,375,055 a credit matrix is derived and stored at a plurality of regional nodes of a distributed network, with each regional node distributing market information to a set of trader terminals to which the regional node is connected via an access node. The regional node is known as a Market Distributor and provides dealable price information to the trader terminals connected via the access node known as a Market Access Node. The actual matching of bids, offers, buy and sell commands is provided by separate nodes known as Arbitrators.

We have appreciated problems with both the first, host system and second, distributed system discussed above. In particular, we have appreciated that a computer trading system should be capable of handling message flow in a global environment in which traders may be on different continents. In the host system, messages between trader terminals must travel unnecessarily large distances to reach the single, host computer. This is particularly the case because deals may often fail because traders attempt to "hit" displayed prices which are derived from quotes submitted by traders with which they have no credit. In the second, distributed system the burden of message traffic is reduced by pre-screening prices for credit compatibility. However, messages must still flow between Arbitrator nodes and Market Distributor nodes so that the trader's view of an available market and the actual market available for matching are synchronised.

We have particularly appreciated that trading in a global trading system is often localised between traders in a particular geographic region and that message flow can be reduced in a global system if designed to take this factor into account, whilst maintaining the possibility of trading between traders at any point on the network.

SUMMARY OF THE INVENTION

In a broad aspect, the invention provides a computer trading system for trading financial instruments comprising: a plurality of broker nodes each performing a broking function and together comprising a distributed network; and a plurality of trader terminals connected to the distributed network, wherein each of the broker nodes comprises: a store of quotes available for trading; means for deriving market views from the store of quotes; means for providing the market views to the trader terminals; and a matching facility for matching compatible quotes and orders submitted by the plurality of trader terminals.

The invention provides a significant advantage in that quotes and orders can be matched by the same broker nodes that provide the market views to the traders connected to the network. This ensures that the market views provided to traders are identical to the actual market available for trading. In addition, because there are a plurality of broker nodes the process of distributing and matching quotes and orders can occur at a plurality of physical locations so that traders using the system at those different locations do not suffer time delays in the transit of messages to a single host computer, or between computers performing the separate functions of price distribution and order matching. The key advantages are thus that orders can be matched closer to the traders, deal execution and price updates are faster, market views may be customized and the use of multiple broker-trading agent connections increases performance benefits and redundancy.

These advantages occur for the following reasons. A hit submitted by a trader is sent to its nearest broker node. It is often the case that this broker node will be able to match the hit with a quote. This is because trading occurs in different geographic regions at different times, so that a market maker and a taker are likely to be physically located in the same trading region at any particular time. This statistical likelihood means that message flow, and hence required bandwidth, throughout the network can be reduced.

A system embodying the invention is such that each broker node comprises means for generating a message notifying other broker nodes of the existence of a quote submitted by one broker node. This distribution mechanism ensures that all broker nodes have an up-to-date store of all quotes available in the system.

Each broker node in the embodying system also comprises means for storing an identifier which identifies each broker node from which a message notifying the existence of each quote was received. This allows messages to be targeted to broker nodes from which a quote originates.

The broker nodes in the embodiment are arranged so that the store of quotes available for trading is modified at each broker node in accordance with matches performed by the matching facility. This ensures that the list of quotes is kept up-to-date as soon as matches occur, which as previously described are often concentrated in one region at any one time.

BRIEF DESCRIPTION OF THE DRAWINGS

An embodiment of the invention will now be described, by way of example only, and with reference to the accompanying figures in which.

DESCRIPTION OF A PREFERRED EMBODIMENT

The purpose of the embodying system is to allow traders to enter quotes and orders which are then matched within the system. The system provides a platform for trading at least the following instruments: FX Spot, FRA, and Forwards and also FX Forwards, CFDs, short-dated government and/or central bank paper, commercial bills, CDs, inter-bank deposits, commercial paper, repos, interest-rate futures, swaps, options and a miscellany of tailor-made variants on these basic products. These are all referred to as financial instruments.

Traders at trader terminals submit quotes and hits which are then passed on to each of a plurality of broker nodes throughout the system. A quote is a bid or offer order submitted by a trader to "make a market" and is distributed to other traders as part of a market view. Quotes are thus orders visible to other traders. A hit is a buy or sell submitted by a trader wishing to create a deal on the basis of a price displayed on his market view derived from one or more quotes. Hits are orders which are invisible to other traders.

Figure 1:
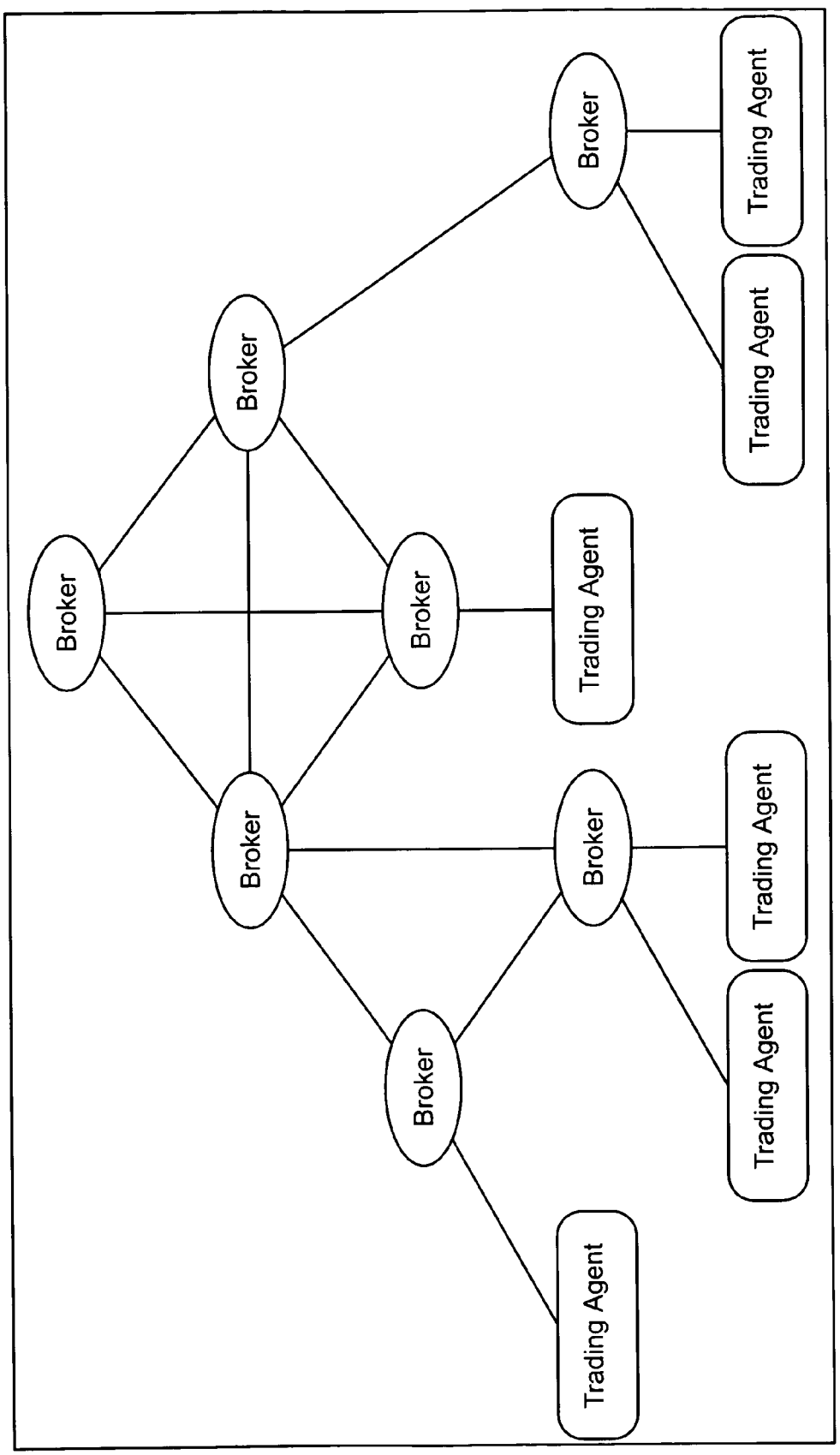
FIG. 1: is an overview of a trading system embodying the invention.

The computer trading system of FIG. 1 comprises a plurality of trading agents 10 each connected to at least one of a plurality of broker nodes 12. Each trading agent is the means by which the trader terminals access the trading system.

Trader terminals (not shown) may be workstations or other computer terminals configured to submit quotes and orders (usually through use of a specialised key pad) and to display market view data, including price and amount available, for financial instruments to be traded. Traders are typically grouped as part of a financial institution, such as a bank, which arranges traders as part of a trading floor. A trading floor is a group of traders under common control of a trading floor administrator who allocates credit lines for the trading floor against other trading floors. The market view for a trader, or group of traders, is the market information (price, volume, etc.) That the traders can see that reflect the market. The market views are preferably pre-screened for credit compatibility.

The embodying system is preferably an anonymous trading system in which the market views produced by the brokers comprise price and amount information without identifying the source of the price. The prices displayed for available bids and offers and the amounts available at those prices, are thus aggregates of one or more quotes. Only the quotes of parties satisfying the pre-screen credit criteria are included in the aggregate price displayed. The market views produced by the broker nodes thus differ from one trading floor to another depending on the credit allocation.

The trading agent node provides services to a specific trading floor or group of traders. These services include providing access to the network for each trading work station, completing deals, producing deal tickets and maintaining historical dealing information for traders. Each trading agent node must connect to at least one broker node to access the trading system. A group of trader terminals thus connects to a trading agent 10 to access the system. The trader terminals are used by traders to view the market and to input orders into the system. Trader terminals are one example of order input devices. An order may be input manually by a trader using a keypad or it could be automatic. For example, a trader may program his terminal to submit an order once the market reaches a given state, or the orders may be generated from an institutions' own dealing systems.

Each Broker node 12 provides the basic order matching and price distribution services. The Broker nodes are arranged in a structure called a Clique Tree which enables faster communications routing, following very specific but simple rules. The Clique Tree is a network structure where individual nodes are grouped into Cliques, and the Cliques are then arranged into a tree structure. Each Broker node can be linked logically to a number of Broker nodes, which are referred to as its neighbor Broker nodes. Communication between Broker nodes is on an equal level, with no "up "or "down "direction in the network.

While Trading Agents must be connected to at least one Broker node, they themselves are not members of the Clique Tree, but remain outside the structure. A Trading Agent connected to multiple Broker nodes will receive multiple sets of market prices. Even though the price information from different Broker nodes can be substantially the same, the information may be received at different intervals. A Trading Agent will send a given trading order to only one Broker node.

The term Broker node is used to describe a computer arranged as a physical or logical node in a computer network providing a broking function. The basic broking function is the storing of quotes, providing the quotes to traders in the form of a market view and matching quotes and orders. The Broker nodes in the described embodiment also perform further functions, but these are not essential features of what is defined as a Broker node.

The Broker nodes are equal to each other, and perform the same functions. The arrangement of the network or their position in it is transparent to the broker nodes. They only need to know about their neighbors. Each Broker node has: knowledge of all orders in the market, and is able to match orders as soon as they are submitted. As a consequence of the fact that each Broker node maintains a full list of orders in the market, it is therefore able to customize market views as needed by the Trading Agents and is able to react faster to market information as soon as it is received.

Figure 2:
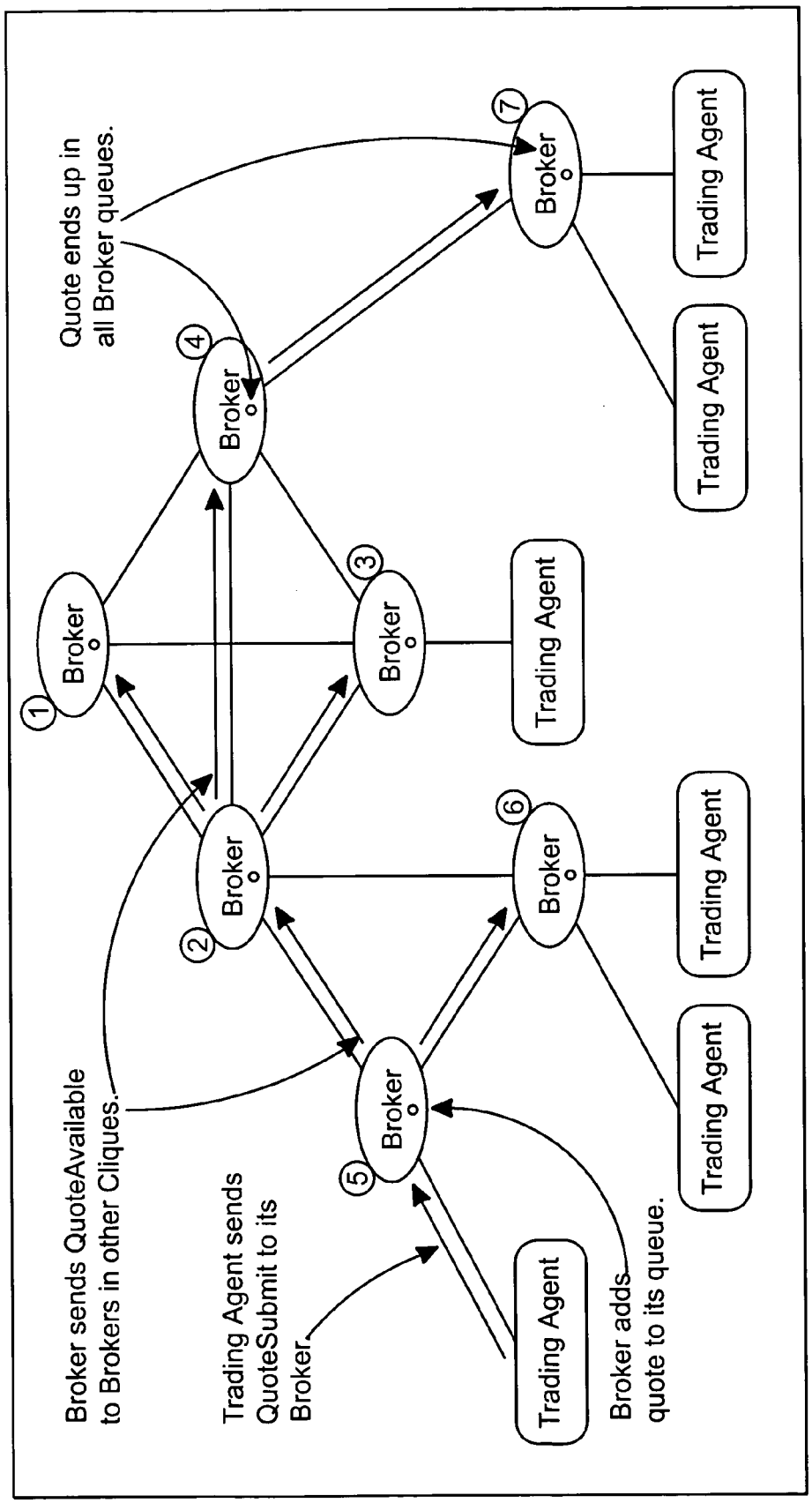
FIG. 2: shows the flow of messages when a new quote is submitted in the system.

To understand the purpose of the distributed broker node arrangement, price distribution and deal execution will now be described with reference to FIG. 2.

The deal process begins with one or more traders submitting orders into trader terminals. An order is a dealing request from a trader, with instructions to buy or sell with specific restrictions, such as price and amount. A quote is a persistent order that remains available in the system and is distributed as part of the market price information. Quotes are used to "make the market", and are known to traders as bids or offers. A hit is an order that has the "invisible" and "fill or kill" properties. Hits are not distributed as part of the market price. A hit does not remain in the system; if it can not be dealt when entered, it is removed.

An Order Book is a list of all the available orders in the market. Since the Quotes are the only available orders, the book consists of a list of Quotes. The Quotes are arranged in a queue in the correct dealing order. The sort order of the queue may vary for different trading instruments. The default sort order is by price and time. In the system, each Broker node maintains a complete list of all available quotes.

The message flow in the system is described by named messages, each carrying appropriate parameters throughout the network. The process of submitting a quote (persistent order) begins when a Trading Agent receives information from a trader workstation that a trader has issued a bid or offer. The Trading Agent then starts the quote submission process. When the Trading Agent receives the quote information from the trader workstation, it will create and maintain a context for the quote. It will then send a Quote Submit message to the Broker node that it is connected to. The Broker node will validate the quote and accept it if valid. This first Broker node that receives the quote becomes the "owner" Broker node for this quote. In example shown in FIG. 2 this is Broker node 5. This is the only Broker node that can commit the quote to a deal. The Broker node will create a context or "quote object" and sort it into its queue for the correct tradable instrument.

After the quote is placed into its queue, the owner Broker node will then distribute the quote throughout the network by sending QuoteAvailable messages to other Broker nodes. In this example, Broker node 5 sends the QuoteAvailable message to Broker nodes 2 and 6. As each Broker node receives the message, it creates a context (quote object) and sorts it into its queue (order book). It notes in the context which Broker node had sent it the message. After placing it into the queue, the Broker node then sends the QuoteAvailable message on, using broadcast routing rules, to all neighbors in other cliques. Therefore, Broker node 2 sends it to 1, 3 and 4. Broker node 4 then sends it to Broker node 7. At this point, all Broker nodes know about the quote, and update their order books accordingly.

The broadcast routing rules are applied to ensure that network traffic is handled in an efficient manner and to reduce any duplication of message flow.

The broadcast rules are:
1. The Broker node originating information will send it to all of its neighbour Broker nodes.
2. A Broker node receiving the information will send it to all of its neighbour Broker nodes except those in the same clique as the Broker node that sent the information.
3. If a message contains persistent information, such as a quote, the information will be stored with the identifier of the Broker node from which the information was received.

Note that these rules refer to the information, not the message that contains it. For example, information about a quote may be sent to one Broker node in a ProposeDeal message and to another Broker node in a MarketUpdate message. However, the same information is sent to both Broker nodes, and so that above rules apply.

Figure 3:
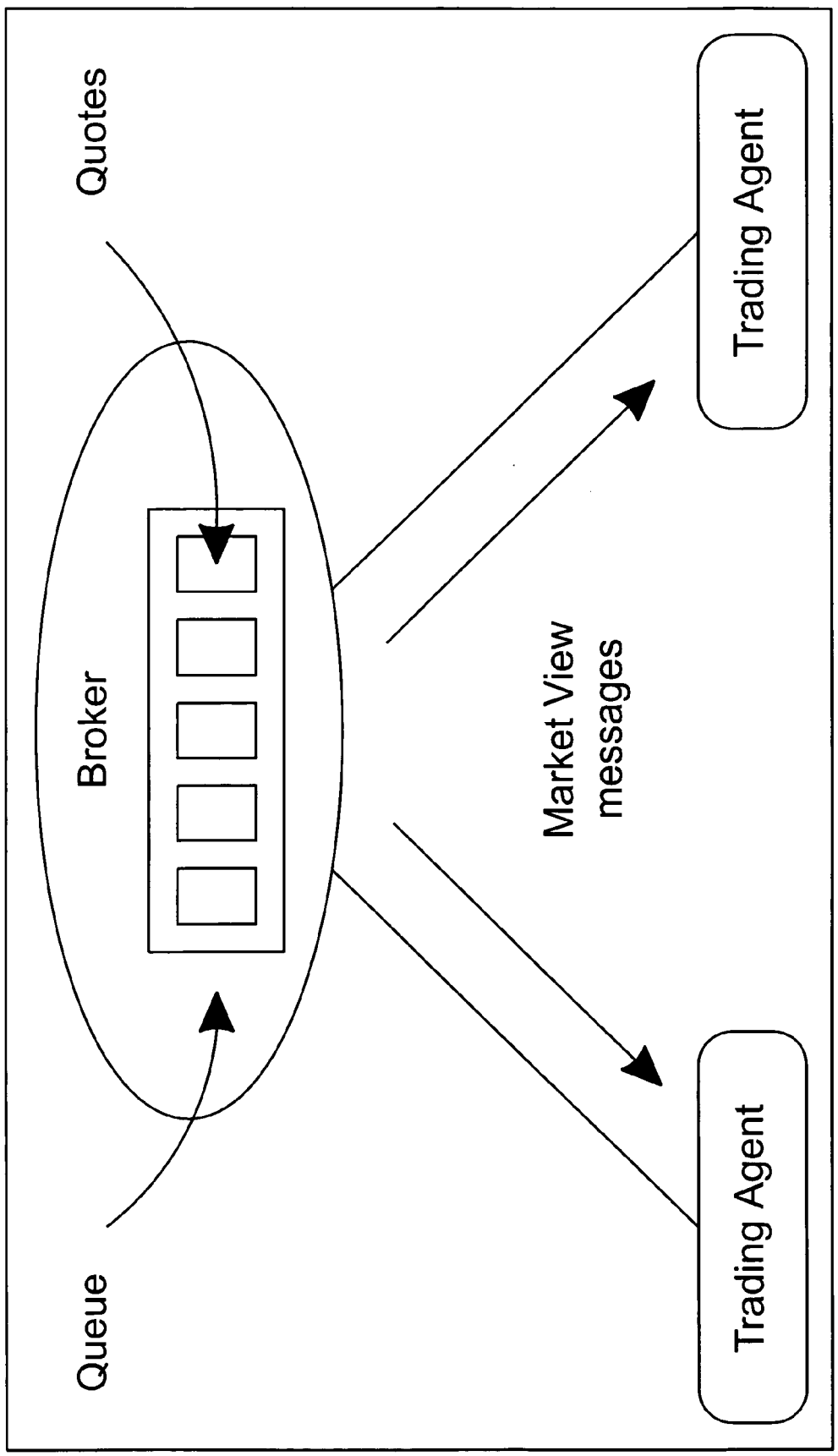
FIG. 3: depicts the production of a market view to traders.

Price distribution is the process of providing market information to the traders at the trader terminals. This information is created by the Brokers nodes and sent to the Trading Agents for distribution to the traders. This process is shown in FIG. 3.

Each Broker node will examine its queue of quotes (order book) and calculate a view of the market for each Trading Agent connected to it. This view is built specifically for the trading floor that the agent represents. Views may be different based on credit or other factors. The exact process for determining a market view will vary based on the trading instrument. The view information is sent to the Trading Agent in a MarketView message.

Figure 4:
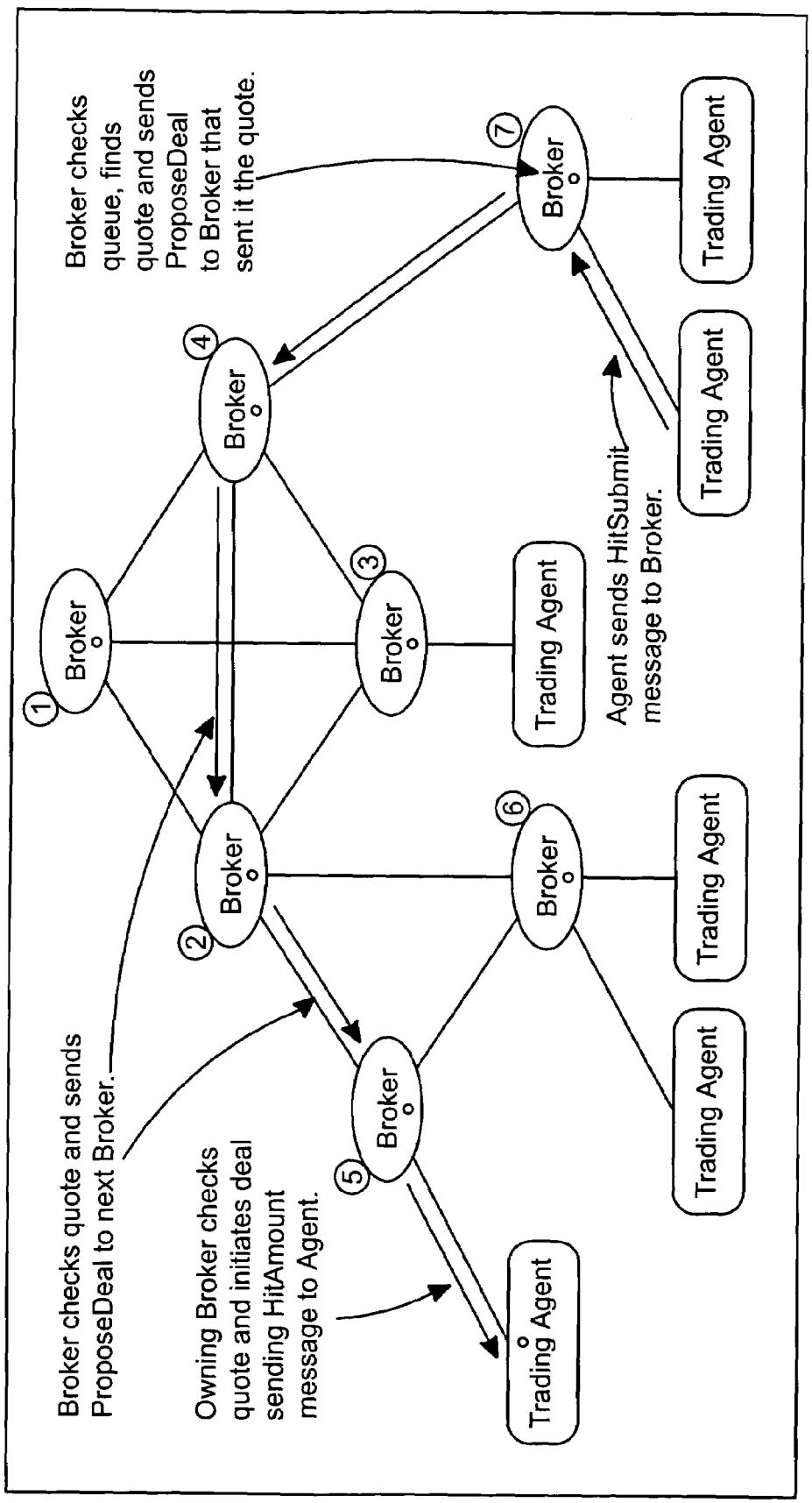
FIG. 4: shows the flow of messages when a trader submits a buy or sell order.

Hitting a quote is the basic process of creating a deal between two traders. A hit from one trader is matched to a quote from another trader. This process is shown in the FIG. 4. The Trading Agent of the trader terminal hitting a price shown on his market view display sends a HitSubmit message to the Broker node. This message targets a price, not a specific quote. The Broker node will scan its queue and find the first quote in the queue that can be matched with the hit. The matching rules may vary based on the trading instrument.

When the hit is matched to a quote, the Broker node will modify its context for the quote, moving the amount matched from "available" to "reserved pending deal". This will prevent the same amount of the quote to be matched with another hit. The Broker node will then send a ProposeDeal message to the Broker node from which it received the quote. This message will target the specific quote. In this example, Broker 7 will send the message to Broker 4.

As each Broker node receives the ProposeDeal message, it checks the quote in its queue. If the amount of the proposed deal is still available in the queue, the Broker node performs a similar process as the matching Broker node. The amount of the proposed deal is moved from "available" to "reserved pending deal". The ProposeDeal message is then sent to the Broker node from which it received the quote. In the example, Broker node 4 sends it to Broker node 2. Broker node 2 will then send it to Broker node 5.

The routing of a ProposeDeal message follows targeted routing rules. Targeted routing is used to deliver information to a specific Broker node. Since knowledge of specific Broker nodes is not built into the system, the target is not a specific Broker node, but is the Broker node from which the information originated. For example, a message is not sent to "Broker node 714", but is sent as to "the Broker node originating quote 42". The targeted rules are:
1. A Broker node originating a message about a specific piece of information, will send the message to the Broker node from which it received the original information.
2. A Broker node receiving a message about a specific piece of information that it did not originate, will send the message to the Broker node from which it received the original information.

The message will thus follow the path of the original information back to its source. In the example this is from Broker node 7, to Broker node 5, via Broker nodes 2 and 4 direct.

When the Broker node that originally created the quote receives the ProposeDeal message, it performs the same checks and amount reservation as the other brokers. Since this Broker node owns the quote, it has the authority to commit the quote to a deal. The ProposeDeal message represents the authority to commit the hit to the deal. The Broker node will then initiate the deal process by sending a HitAmount message to the Trading Agent that submitted the quote. The deal execution process is described later.

Figure 5:
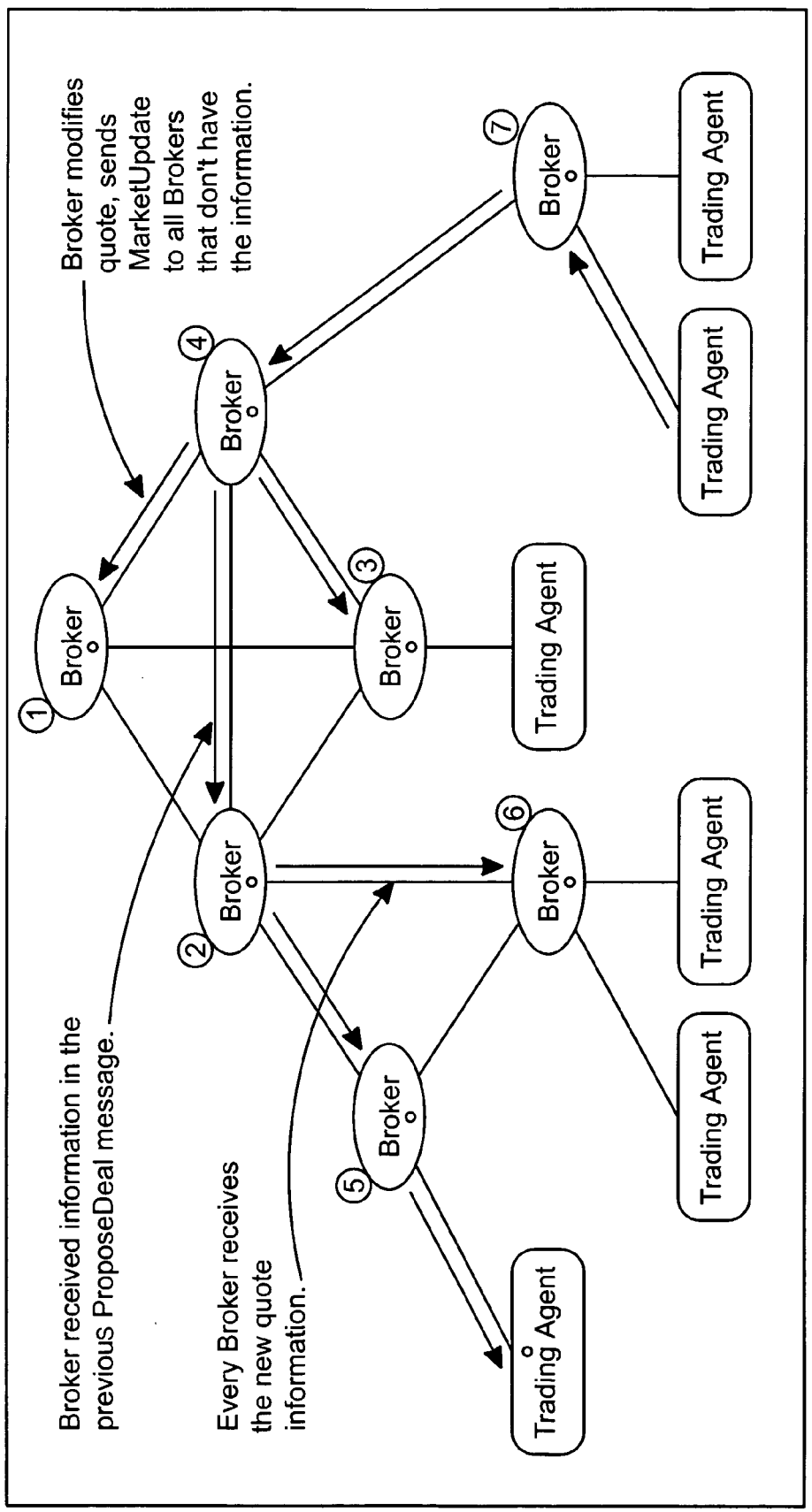
FIG. 5: shows the flow of messages to update broker nodes following a buy or sell order.

As the deal matching process takes place, it is necessary that the list of quotes maintained at each Broker node be kept up to date. This is accomplished by each Broker node notifying others when it makes a change to a quote, as shown in FIG. 5.

As each Broker node changes a quote in its queue, it notifies all neighbor Broker nodes except those in the clique from which it received the change. In the example above, Broker node 4 received notice of a change in a quote from Broker node 7 in a ProposeDeal message. It notifies Broker node 2 by sending the ProposeDeal message. Broker node 4 must now notify Broker nodes 1 and 3. This is done by sending a MarketUpdate message to these Broker nodes.

Following the normal routing rules, the information about the quote is distributed to each Broker node in the network. Any Broker node receiving the MarketUpdate message will pass it to all neighbors not in the clique from which it is received. Note that a Broker node sending a ProposeDeal message should not also send a MarketUpdate message to the same Broker node. This would result in duplicate information being received and the deal amount being reserved twice.

Figure 6:
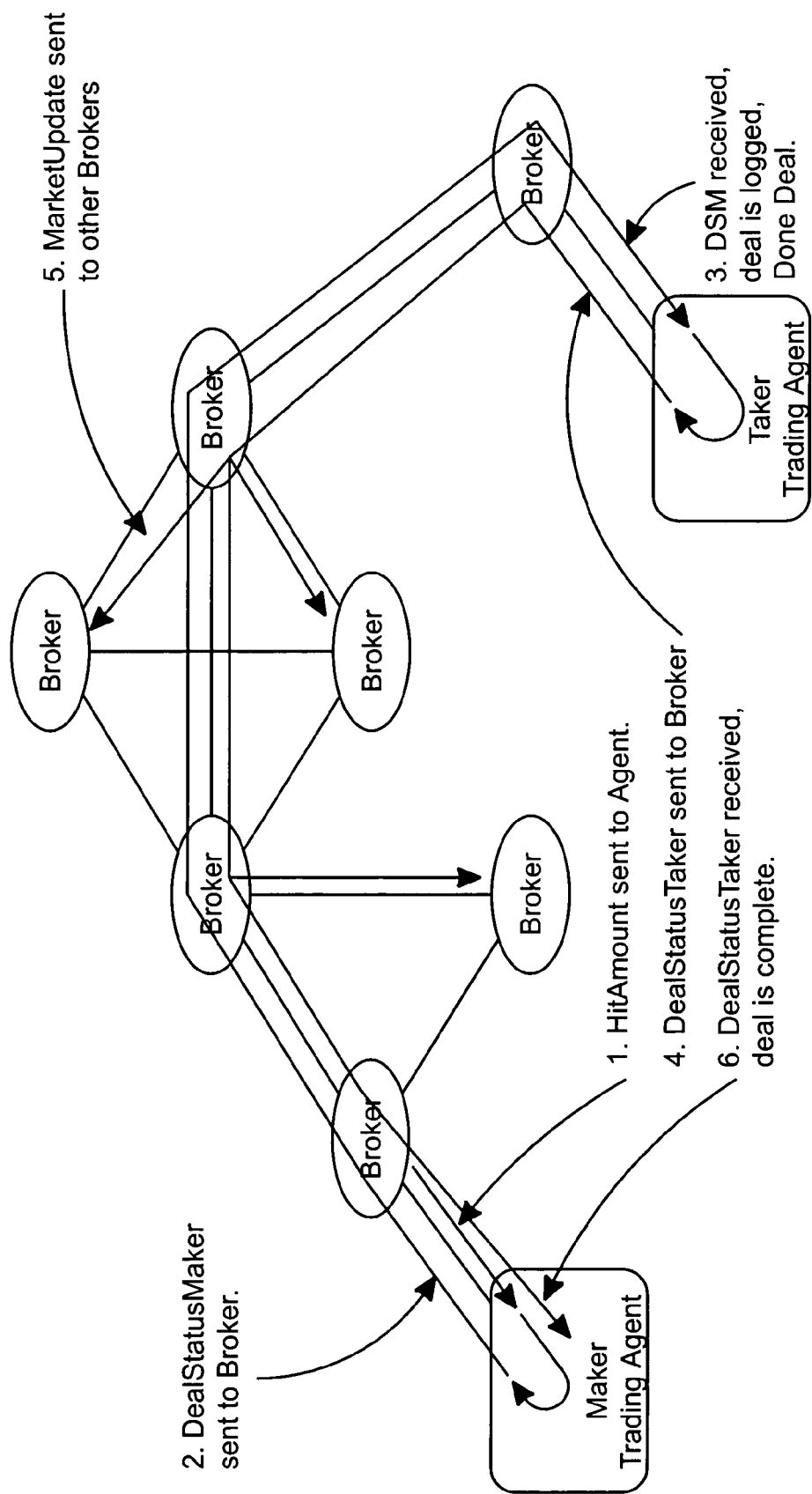
FIG. 6: shows the deal execution process.

The deal execution process itself is not central to the present invention, but will now be described for completeness. When the deal matching process is completed, as described above, the deal execution process begins. This process completes the deal and commits the traders to a deal. The process is shown in FIG. 6. As matches are made and deals initiated, information is made available for traders. This information can be used to inform a trader that a deal is pending. Any given trading application can decide if the trader should be informed. In any case, the information is available.

The Taker's Trading Agent will be notified as soon as the initial match is made and the ProposeDeal message is sent. This agent can notify the traders workstation at this time. This pending deal information may change as the matching process continues. The maker workstation is notified of the pending deal when the maker's Trading Agent checks credit and sends the DealStatusMaker message.

The deal execution process begins when the maker's Trading Agent receives a HitAmount message from its Broker node. This message informs the Agent that a match was made for one of its quotes. The message identifies the quote as well as the amount of the hit, counterparty and the identity of the hit. The Agent will check with the trader workstation to make sure that the quote is still available. The Agent will send a HitAmountWS message to the workstation. The workstation will reply with a HitAmountACK message to show that the workstation is still working and that the trader did not interrupt the quote. At this point, the trader can no longer interrupt the deal.

The Trading Agent will next check for available credit with the counterparty. The credit check may allow the deal, reduce the amount of the deal or disallow the deal. The Agent will then reduce the available credit by the amount needed for the deal. This reduction in available credit may affect future deals. The maker's Trading Agent will now inform the taker's Trading Agent of the deal by sending a DealStatusMaker message to its Broker node. The message is targeted to the identity of the hit. The network Broker nodes will route the message to the owner Broker node of the hit, and that Broker node will deliver it to the taker's Agent. Once this message is sent, the maker's Agent knows that a deal may have been done, but the deal is in doubt pending a reply. The taker's Trading Agent completes the deal execution process. This part of the process takes place when the Agent receives the DealStatusMaker message from the maker. If the message shows a valid deal, the process continues.

The taker's Trading Agent will next check for available credit with the counterparty in a similar manner as the maker. The credit check may allow the deal, reduce the amount of the deal or disallow the deal. The Agent will then reduce the available credit by the amount needed for the deal. This reduction in available credit may affect future deals. The taker's Trading Agent will now log the deal to its disk. As soon as the information is committed to persistent storage, the deal is done. Any checks on the deal status will now show a binding deal. The agent will now notify the trader, print a deal ticket and perform any other post deal processing. At this point, the deal is done but the maker doesn't know yet. As soon as the deal is done, the taker's Trading Agent will notify the maker by sending a DealStatusTaker message to its Broker node. This message is targeted to the quote and will be routed to the maker's Agent.

The DealStatusTaker message contains final information about the deal, and therefore the final changes to the quote. This information is used by the network Broker nodes and the Trading Agent. As the DealStatusTaker message is routed through the Broker nodes, each routing Broker node will use the information to update its quote context. The amount of the deal is moved from "reserved" to "complete". The portion not done is moved from "reserved" to "available" if the quote is still active. It will then notify other Broker nodes of the changes and of the deal by sending a MarketUpdate message to all other Broker nodes using network routing rules.

When the DealStatusTaker message gets to the owner Broker node of the quote, it will send it to the Trading Agent. The Agent will record the deal to disk. At this point the deal is no longer in doubt. The Agent will notify the trader, print a ticket and perform any other processing that is required. Some trading instruments may require additional information to be exchanged for a deal. An example of this is the settlement instructions for EBS spot F/X. This type of information is sent in a DealInformation message. After the deal is processed, the Agents can develop this information. The deaIInformation message is sent to the Broker node. The network Broker nodes will then route the message to the other Agent where the information is processed as required by the instrument. A deal is thus completed.

The invention claimed is:

1. A computer trading system for trading fungible instruments, comprising:
   (A) a communication network for distributing electronic messages;
   (B) a plurality of order input devices connected to the communications network each for generating electronic order messages; and
   (C) a plurality of Broker nodes connected to the communications network, each Broker node arranged to perform a broking function including matching orders and providing market views, prescreened for credit, to trader terminals, each Broker node comprising:
      (1) a store of orders available for trading in the system;
      (2) means for deriving a market view from the store of orders;
      (3) means for providing a market view from the store of orders;
      (4) means for providing the market view to at least one of the plurality of trader terminals; and
      (5) a matching facility for matching compatible orders submitted by the plurality of order input devices.

2. A computer trading system according to claim 1, wherein the store of orders holds orders submitted to the trading system from order input devices via other Broker nodes.

3. A computer trading system according to claim 1, wherein each Broker node further comprises means for sending orders to other Broker nodes connected to the communications network.

4. A computer trading system according to claim 1, wherein the matching facility in each Broker node comprises means for analysing the store of orders to select one order matching another order.

5. A computer trading system according to claim 1, wherein each order input device is associated with one Broker node, and the means for providing a market view comprises means for sending price information to each trader terminal derived only from orders in the store of orders provided by other order input devices with which each said trader terminal can deal.

6. A computer trading system according to claim 1, wherein each Broker node further comprises means for notifying other Broker nodes of the existence of compatible orders.

7. A computer trading system for trading financial instruments comprising:
  a plurality of Broker nodes each performing a broking function and together comprising a distributed network; and
  a plurality of order input devices connected to the distributed network, wherein each of the Broker nodes comprises:
  a store of orders available for trading in the system;
  means for deriving a market view from the store of orders;
  means for providing the market view, prescreened for credit, to at least one of the plurality of the order input devices; and
  a matching facility for matching compatible quotes and orders submitted by the plurality of order input devices.

8. A computer trading system according to claim 7, wherein each Broker node comprises means for generating a message notifying other Broker nodes in the network of the existence of an order submitted by the Broker node.

9. A computer trading system according to claim 7, wherein each Broker node comprises means for storing an identifier which identifies the Broker node from which a message notifying the existence of each order was received.

10. A computer trading system according to claim 7, wherein the means for providing the market view to at least one of the plurality of trader terminals comprises means for deriving dealable prices from the orders in the store of orders.

11. A computer trading system according to claim 10, wherein the dealable prices are determined from a subset of orders corresponding to traders with which credit is available on a bilateral basis.

12. A computer trading system according to claim 1, wherein the store of orders available for trading is modified at each broker node in accordance with matches performed by the matching facility.

13. A computer trading system for trading assets between traders, the computer trading system comprising:
  a communications network;
  a plurality of order input terminals coupled to the communications network, each order input terminal effective to communicate with a respective trader and to generate electronic order messages in response thereto, the electronic order messages including quotes and hits; and
  a plurality of broker nodes coupled to the order input terminals and forming at least part of the communications network;
  wherein:
  each broker node is effective to analyze at least one of the electronic order messages, to produce a market view, prescreened for credit, based on the electronic order messages, and to match a quote with a corresponding hit.

14. The computer trading system as recited in claim 13, wherein:
  each trader has a line of credit with every other trader; and
  a particular broker node produces a particular market view for a particular trader based on the lines of credit between the particular trader and the other traders.

15. The computer trading system as recited in claim 13, wherein the broker nodes are arranged in a clique tree.

16. The computer trading system as recited in claim 13, wherein the broker nodes further store the quotes until a corresponding hit is received.

17. The computer trading system as recited in claim 13, wherein each broker node is aware of all orders in the communications network.

18. The computer trading system as recited in claim 13, wherein each broker node produces the market view based on the trader receiving the market view.

19. A broker node in a computer trading system, the system for trading assets between traders and comprising a communications network including a plurality of broker nodes, and a plurality of order input terminals coupled to the communications network, each order input terminal effective to communicate with a respective trader and to generate electronic order messages in response thereto, the electronic order messages including quotes and hits, the broker node effective to analyze the electronic order messages, produce a market view, prescreened for credit, based on the electronic order messages, and to match a quote with a corresponding hit.

20. A method for matching a quote from a first trader with a hit from a second trader in a computer trading system using a broker node, the computer trading system including a plurality of order input terminals coupled to a communications network, the communications network including a plurality of broker nodes, each order input terminal effective to communicate with a respective trader and to generate electronic order messages in response thereto, the electronic order messages including quotes and hits, the method comprising:
  receiving electronic order messages at the broker node;
  analyzing at least some of the electronic order messages at the broker node;
  producing a market view, prescreened for credit, for a particular trader, at the broker node, the market view being based on the electronic order messages;
  receiving a hit based on the market view at the broker node; and
  matching a quote with the hit at the broker node.

21. The method as recited in claim 20 wherein:
  the first trader has a first line of credit with the second trader;
  the second trader has a second line of credit with the first trader; and
  the market view is further based on the first and second line of credit.

22. The method as recited in claim 20, wherein the broker node stores the quotes until a corresponding hit is received.

* * * * *